United States Patent
Li et al.

(10) Patent No.: US 10,142,134 B2
(45) Date of Patent: Nov. 27, 2018

(54) MULTI-RATE FINITE IMPULSE RESPONSE FILTER

(71) Applicant: Oracle International Corporation, Redwood City, CA (US)

(72) Inventors: Jiangyuan Li, San Jose, CA (US); Xun Zhang, Westford, MA (US); Jianghui Su, San Jose, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 18 days.

(21) Appl. No.: 15/456,778

(22) Filed: Mar. 13, 2017

(65) Prior Publication Data

US 2018/0262371 A1   Sep. 13, 2018

(51) Int. Cl.
*H04L 12/825*   (2013.01)
*H04L 25/03*   (2006.01)

(52) U.S. Cl.
CPC ........ *H04L 25/03025* (2013.01); *H04L 47/25* (2013.01); *H04Q 2213/13363* (2013.01)

(58) Field of Classification Search
CPC .............. H04L 25/03025; H04L 47/25; H04Q 2213/13363
See application file for complete search history.

(56) References Cited

U.S. PATENT DOCUMENTS

| | | | | |
|---|---|---|---|---|
| 4,131,767 A | * | 12/1978 | Weinstein | H04L 5/1423 379/406.06 |
| 4,757,452 A | * | 7/1988 | Scott | H04J 3/07 324/76.77 |
| 5,648,923 A | * | 7/1997 | Lane | H03H 17/06 708/316 |
| 9,819,520 B1 | * | 11/2017 | Huss | H04L 25/03057 |
| 9,942,028 B1 | * | 4/2018 | Dickson | H03M 9/00 |
| 2010/0046683 A1 | * | 2/2010 | Beukema | H04L 7/0062 375/355 |
| 2014/0098844 A1 | * | 4/2014 | Mobin | H04B 1/40 375/219 |
| 2014/0355662 A1 | * | 12/2014 | Kizer | H04L 25/0276 375/233 |

* cited by examiner

*Primary Examiner* — Raj Jain
*Assistant Examiner* — Chuong M Nguyen
(74) *Attorney, Agent, or Firm* — Marsh Fischmann & Breyfogle LLP; Kent A. Lembke; Daniel J. Sherwinter

(57) ABSTRACT

Embodiments include systems and methods for implementing a multi-rate FIR by using rate-dependent bit stuffing on the cursor, while using rate-independent (e.g., full-rate) spacing on the pre- and post-cursor. For example, in the FIR data path, the cursor bit output is generated using bit stuffing, depending on a selected rate mode (e.g., full-rate, half-rate, quarter-rate, eighth-rate, etc.), but the spacing of the pre-cursor, cursor, and post-cursor are maintained at 1 UI apart (i.e., the full-rate spacing) for all rate modes. Such an approach can appreciably reduce complexity of the logic and can appreciably relieve the critical timing path.

19 Claims, 5 Drawing Sheets

MULTI-RATE FINITE IMPULSE RESPONSE FILTER

FIELD

Embodiments relate generally to transmitter circuits, and, more particularly, to techniques for generating full-rate and sub-rate finite impulse response (FIR) filter outputs at high data rates.

BACKGROUND

Many integrated circuits have signal lanes that support transmission and/or receipt of data signals. Those signal lanes can include circuitry (e.g., serializer/deserializer, or SERDES, circuits) to prepare bit data for transmission and/or to recover bit data after receipt. Some transmitter-side circuits include a finite impulse response (FIR) filter. Supporting increasing signal data rates can involve increasing the operating speed of the FIR filter. For example, some newer circuits can operate at data rates of 25 Gigabits per second or more. Often in such circuits, however, some functions operate at the full data rate, while other functions operate at sub-rates (e.g., half rate, quarter rate, eighth rate, etc.). While some conventional FIR filters have been designed to support different data rates, those designs have typically involved complex circuits that tend to be ineffective at high data rates (e.g., it can be impractical to close the timing for such circuits).

BRIEF SUMMARY

Among other things, embodiments provide novel systems and methods for implementing a multi-rate finite impulse response (FIR) filter. Some embodiments operate in context of a transmit portion of a serializer/deserializer (SERDES). For example, the SERDES may be coupled with a data channel (e.g., a signal lane having transmit and receive channels), and the SERDES may be one of many implemented in an integrated circuit. Some implementations receive a stream of input bits (e.g., from a read/write queue) and receive a rate select signal that indicates a selected rate (e.g., full rate, half rate, quarter rate, etc.). Cursor bit-stuffing can be used to generate a cursor output bit stream according to the selected rate. Rather than separately generating full-rate and sub-rate pre-cursors and post-cursors, embodiments generate the pre-cursors and post-cursors directly from the cursor output bit stream at full rate. For example, regardless of the rate, the post-cursor bit can be generated as bit B(T) of the cursor output bit stream, the cursor bit can be generated as bit B(T−1) of the cursor output bit stream, and the pre-cursor bit can be generated as bit B(T−2) of the cursor output bit stream. Some implementations also adjust pre-cursor and post-cursor tap weights in sub-rate modes, so that a sub-Nyquist frequency slope profile (e.g., the slope at each point along the transfer function for frequencies at and below the Nyquist frequency) of the FIR transfer function at the selected sub-rate substantially matches the sub-Nyquist frequency slope profile of an FIR transfer function at the full rate.

BRIEF DESCRIPTION OF THE DRAWINGS

The present disclosure is described in conjunction with the appended figures.

Figure 1:
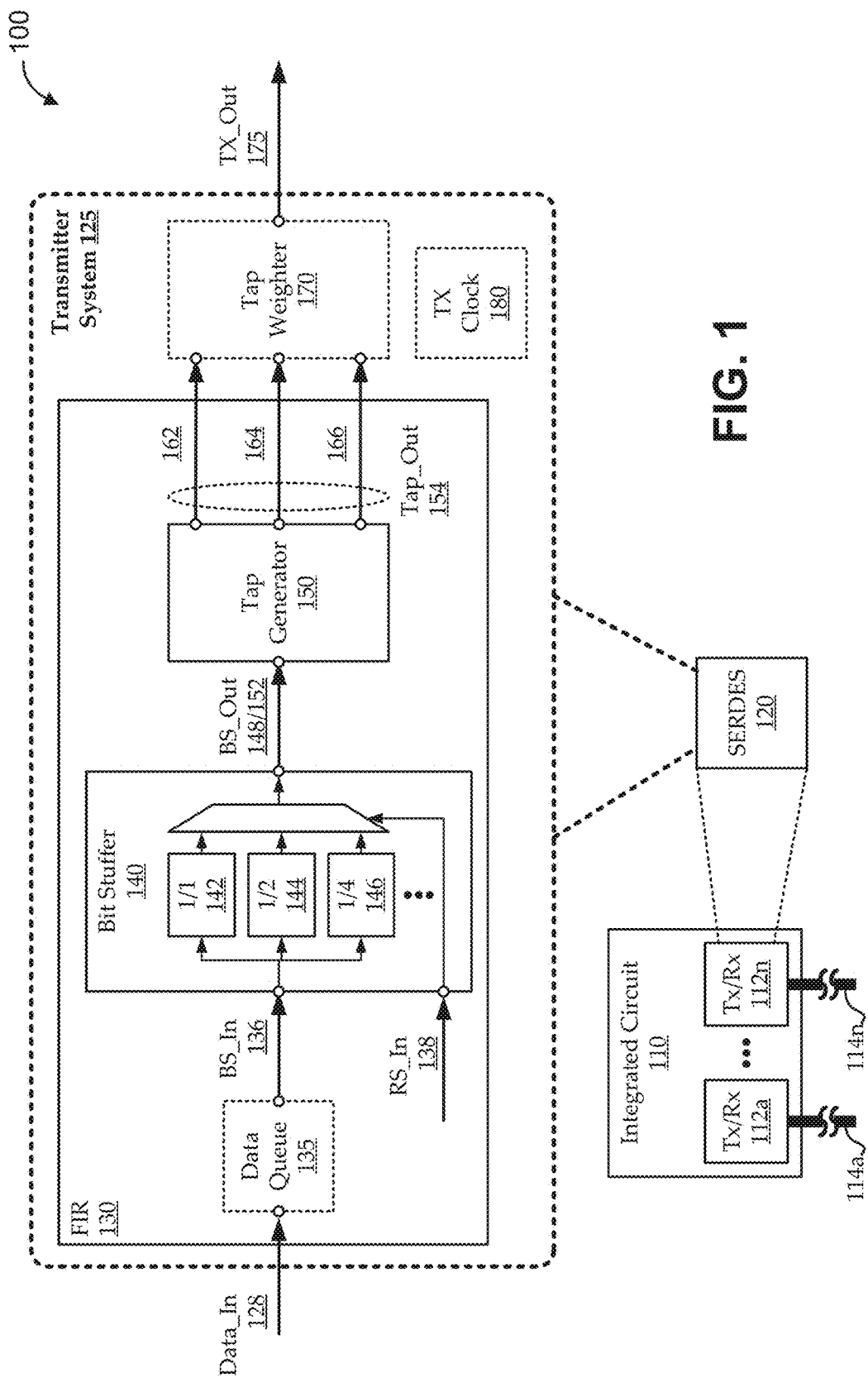
FIG. 1 shows a block diagram of an illustrative integrated circuit environment having a transmitter system, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Supporting ever-increasing data rates in modern integrated circuits can involve implementing transmission circuits that can handle such increasing data rates. For example, some modern protocols operate at data rates of 25 Gigabits per second or higher. In many applications, however, it is desirable for the transmission circuits also to operate in lower data rate modes, such as in a half-rate mode, quarter-rate mode, etc. Typically, sampling clocks in transmission circuits include phase-locked loop (PLL) circuits, which can only run at limited frequency combinations. Accordingly, some implementations introduce bit stuffing logic into the data path to achieve desired data rates. For example, to move from a full-rate mode to a half-rate mode, the bit stuffing logic can effectively repeat each bit in the bit stream, thereby doubling the duration of each symbol and halving the bitrate.

Implementing the bit stuffing can involve adding logic for each additional rate mode to be supported, so that supporting multiple rates can involve relatively large, complex logic circuits in the data path. For example, the bit stuffing logic may be added into the FIR data path (i.e., the data path through the finite impulse response (FIR) filter of the transmitter portion of the serializer/deserializer (SERDES) circuit), which can involve impacting cursor, pre-cursor, and post-cursor data for the transmission data channel. Such approaches tend to introduce many flops (and or other components), which can appreciably increase power, area, and data path latency. For example, multi-rate bit stuffing logic blocks can be repeated to generate the cursor, pre-cursor, and post-cursor; such that the spacing of the pre-cursor, cursor, and post-cursor are 2 clock unit intervals (UIs) apart for half-rate mode, 4 UI apart for quarter-rate mode, 8 UI apart for eighth-rate mode, etc. As data rates increase, the data path clock period shrinks. As a result, it can become increasingly challenging to close timing on the data path with high data rates when supporting multiple sub-rate modes with bit stuffing. Some conventional implementations seek to address the timing closure by adding pipelines on the data path, for example, to shorten the physical path for critical timing paths to help close timing. However, such approaches may not be practical as data rates increase. Other conventional approaches increase the clock period of the data path (e.g., changing the clock period from 4 T to 8 T, where 1 T is 1 UI). Such an approach tends to involve many changes to the interface and to the analog circuits, which can be complex to implement.

Embodiments described herein provide a novel approach for implementing a multi-rate FIR by using rate-dependent bit stuffing on the cursor, while using rate-independent (e.g., full-rate) spacing on the pre- and post-cursor. For example, in the FIR data path, the cursor bit output is generated using bit stuffing, depending on a selected rate mode (e.g., full-rate, half-rate, quarter-rate, eighth-rate, etc.), but the spacing of the pre-cursor, cursor, and post-cursor are maintained at 1 UI apart (i.e., the full-rate spacing) for all rate modes. Such an approach appreciably reduces complexity of the logic and appreciably relieves the critical timing path. For example, such implementations tend not to introduce additional pipeline flops, interface changes, etc. Such an approach has been demonstrated experimentally to achieve similar performance to that of a single-rate FIR, while achieving at least a 25 Gbps data rate and while supporting four different data rate modes.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

FIG. 1 shows a block diagram of an illustrative integrated circuit environment 100 having a transmitter system 125, according to various embodiments. For the sake of context, embodiments are described herein in context of a finite impulse response (FIR) filter of a transmitter system 125 of a SERDES 120 in an integrated circuit 110. However, such descriptions are not intended to limit implementations to the described context. Rather, embodiments described herein can be implemented in any suitable context, such as in any suitable type of filter, any suitable data path, etc. The illustrated integrated circuit 110 can be a microprocessor, or any other suitable integrated circuit 110. The integrated circuit 110 includes multiple transmit/receive (Tx/Rx) circuits 112 that can be coupled with data channels 114. Some modern integrated circuits 110 include hundreds of Tx/Rx circuits 112 that can be coupled with hundreds of data channels 114. In some integrated circuits 110, as illustrated, some or all of the Tx/Rx circuits 112 can include a serializer/deserializer (SERDES) 120 (i.e., there may be hundreds of SERDES 120 on some integrated circuits 110). The SERDES 120 can include a receiver system (not shown) that receives a serial input data stream and deserializes it, for example, by recovering digital symbols from the input data stream and generating parallel digital data streams for processing by the integrated circuit. The SERDES 120 can also include a transmitter system 125 that receives a deserialized (parallel) output data stream from integrated circuit 110 components and serializes it for transmission over a data channel 114.

The transmitter system 125 is shown as including a FIR 130 (a FIR filter subsystem). Some implementations of the transmitter system 125 further include a transmitter clock 180, which can be a phase-lock loop (PLL), or any other suitable clock, implemented within the transmitter system 125, as part of the SERDES 120 (e.g., shared by the receiver and transmitter components), and/or in any other suitable location. Some or all of the components of the transmitter system 125 can be clocked according to the transmitter clock 180. Generally, it is assumed herein that the transmitter clock 180 operates at a particular frequency to support a full data rate (e.g., 25 GHz). Some implementations of the transmitter clock 180 can operate at other frequencies, for example, using combinations, multiples etc. However, it is assumed herein that such other operating frequencies do not support the particular data sub-rates addressed by embodiments described herein.

Some embodiments of the transmitter system 125 can also include a tap weighter 170. For example, an input data stream is received by the transmitter system 125 as a digital data input signal 128, the FIR 130 generates a set of taps (e.g., a cursor, pre-cursor, and post-cursor) representing the digital symbols to be transmitted, and the tap weighter 170 applies weights to the taps to effectively generate an analog transmitter output signal 175 (e.g., as a weighted sum of the tap outputs). Other embodiments of the transmitter system 125 can include additional or different components, additional or different taps, etc. For example, as described below, the tap weighter 170 can adjust pre-cursor and/or post-cursor tap weights to modify certain performance characteristics of the transmitter system 125 (e.g., the magnitude response over the operating range of frequencies for the transmitter system 125).

Embodiments described herein include novel techniques for generating tap outputs 154 in the FIR 130. Embodiments of the FIR 130 include a bit stuffer 140 and a tap generator 150. The bit stuffer 140 can include a bit stream input 136 and a rate select input 138. In some embodiments, the FIR 130 further includes a data queue 135 (e.g., a write/read first-in-first-out (FIFO) queue, or any other suitable queue), and the bit stream input 136 is coupled to an output of the data queue 135. The rate select input 138 can include a signal indicating a selected one of a number of predefined data rates. In some implementations, the rate select input 138 can indicate a selected data rate of 1/N times a full data rate (e.g., defined according to the operating frequency of the transmitter clock 180). In one such implementation, N can be 1, 2, 4, or 8, so that the rate select input 138 can indicate a full-rate mode 142 (1/1 times the full rate), a half-rate mode 144 (½ times the full rate), and a quarter-rate mode 146 (¼ times the full rate). Other implementations can support different (e.g., more or fewer) data rate modes.

The bit stuffer 140 can also include a bit stream output 148 that includes a stream of output bits corresponding to the bit stream input 136 and bit-stuffed according to the selected rate indicated by the rate select input 138. The bit stuffing can include sequentially repeating each input bit of the bit stream input 136 N times to bit-stuff the bit stream output 148 according to the rate select input 138. For example, if the bit stream input 136 includes the sequence [D0, D1, D2, . . . ], the bit-stuffed full-rate mode 142 bit stream output 148 would include the sequence [D0, D1, D2, . . . ] (i.e., effectively without bit stuffing), the bit-stuffed half-rate mode 144 bit stream output 148 would include the sequence [D0, D0, D1, D1, D2, D2, . . . ], the bit-stuffed quarter-rate mode 146 bit stream output 148 would include the sequence [D0, D0, D0, D0, D1, D1, D1, D1, D2, D2, D2, D2, . . . ], etc. As illustrated, the rate select input 138 can be used to select a rate mode block (142, 144, 146, etc.) and an amount of bit stuffing, accordingly. For example, the bit stream input 136 can be selectively coupled with multiple (e.g., all) rate mode blocks (142, 144, 146, etc.); and the outputs of the rate mode blocks (142, 144, 146, etc.) can be selectively coupled with the bit stream output 148 via a de-multiplexer (having an output selectable according to the rate select input 138); so that the bit stream output 148 corresponds to a bit-stuffed version of the bit stream input 136 at the selected data rate.

Embodiments of the FIR 130 further include a tap generator 150. The tap generator 150 can include a bit-stuffed stream input 152 and a tap output 154. The bit-stuffed stream input 152 is coupled with the bit stream output 148, so that the tap generator 150 can effectively receive the bit-stuffed stream of bits corresponding to the selected data rate mode. The tap output 154 can include a set of outputs corresponding at least to a cursor bit stream, a pre-cursor bit stream, and a post-cursor bit stream. Other implementations can include additional tap outputs. These bit streams can be latched, so that at each full-rate clock unit interval (T), there is effectively a pre-cursor bit output 162, a cursor bit output 164, and a post-cursor bit output 166. The tap generator 150 generates the tap output 154 from the bit-stuffed stream input 152, so that, at each T, the generated pre-cursor bit output 162, cursor bit output 164, and post-cursor bit output 166 are each spaced apart by one T. As used herein, "latch" is intended generally to include any suitable circuit for temporarily storing sample values according to an input clock, such as one or more flip-flops, or the like.

Figure 2:
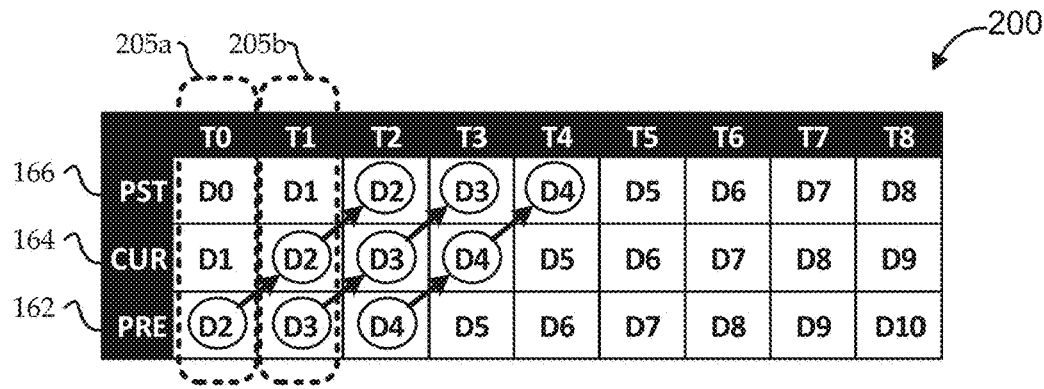
FIG. 2 shows a chart of illustrative bit streams of a tap output at a full data rate generated by a tap generator, such as the one described in FIG. 1.
Figure 3:
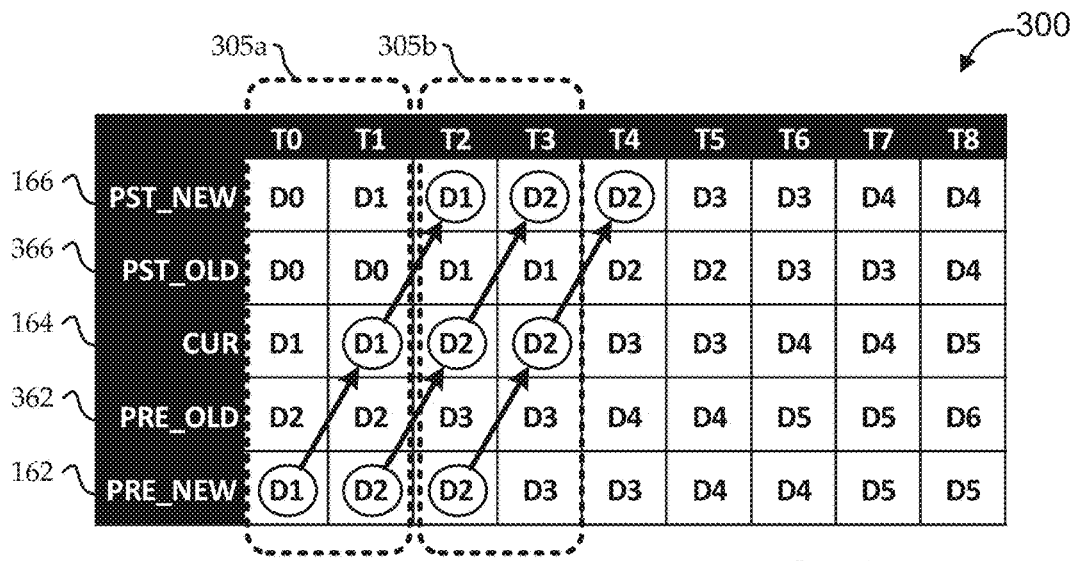
FIG. 3 shows a chart of illustrative bit streams at a half data rate.
Figure 4:
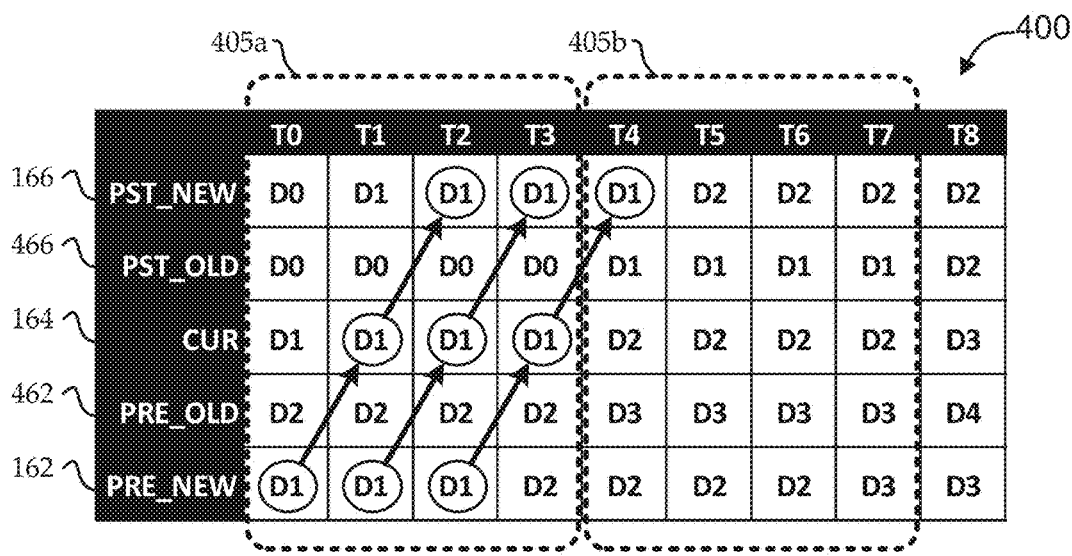
FIG. 4 shows a chart of illustrative bit streams at a quarter data rate.

For the sake of illustration, FIGS. 2-4 show example bit streams at different data rates. FIG. 2 shows a chart 200 of illustrative bit streams of a tap output 154 at a full data rate generated by a tap generator 150, such as the one described in FIG. 1. The chart 200 shows a pre-cursor bit output 162, a cursor bit output 164, and a post-cursor bit output 166 for each of nine full-rate clock unit intervals, represented as T0-T8 (T0 is the present clock unit interval, and T8 occurred eight clock unit intervals ago). At the full data rate, each data interval 205 is one clock unit interval. As illustrated, at any time, the pre-cursor bit output 162, cursor bit output 164, and post-cursor bit output 166 are each separated by one T. For example, the pre-cursor bit output 162 at T0 ("D2") matches the cursor bit output 164 at T1 and the post-cursor bit output 166 at T2; and the pre-cursor bit output 162 at T1 ("D3") matches the cursor bit output 164 at T2 and the post-cursor bit output 166 at T3.

FIG. 3 shows a chart 300 of illustrative bit streams at a half data rate. At half rate, each data interval 305 is two clock unit intervals. For the sake of context, a conventional FIR implementation could include separate data paths for generating pre-cursor, cursor, and post-cursor bits, and each separate data path could perform bit stuffing according to a selected data rate. Such an implementation is illustrated as "PST_OLD" 366 (representing a conventional, separately bit-stuffed generation of a post-cursor bit output) and "PRE_OLD" 366 (representing a conventional, separately bit-stuffed generation of a pre-cursor bit output). As shown, in each data interval 305, the PST_OLD 366 is repeated, and the PRE_OLD 362 is repeated, so that the pre-cursor bit output, the cursor bit output, and the post-cursor bit output, are each effectively separated by 2 T, or one data interval 305.

In contrast, as described in FIG. 1, the tap generator 150 bit-stuffs one of the pre-cursor, cursor, and post-cursor bit streams, and generates the others from the bit-stuffed one. In one implementation, the bit-stuffed stream input 152 is directly latched as the post-cursor bit output 166, the latched post-cursor bit output 166 can be coupled with another latch representing the cursor bit output 164, and the cursor bit output 164 can be coupled with another latch representing the pre-cursor bit output 162. In such an implementation, at any particular T, the post-cursor bit output 166 is generated to correspond to B(T) (where "B" represents a bit), the cursor bit output 164 is generated to correspond to B(T−1), and the pre-cursor bit output 162 is generated to correspond to B(T−2). In an alternate implementation, the bit-stuffed stream input 152 is used directly to generate the cursor bit output 164, and the pre-cursor bit output 162 and the post-cursor bit output 166 are generated from the cursor bit output 164. In another alternate implementation, each tap (e.g., the pre-cursor bit output 162, cursor bit output 164, and post-cursor bit output 166) can directly use the bit-stuffed stream input 152 and can have separate bit-stuffing logic for each data rate.

Such novel tap generation is illustrated by the half-rate bit-stuffed pre-cursor bit output 162, cursor bit output 164, and post-cursor bit output 166 in FIG. 3 (shown over nine full-rate clock unit intervals as T0-T8, as in FIG. 2). Even though the data interval 305 does not match the clock unit interval, at any time, the pre-cursor bit output 162, the cursor bit output 164, and the post-cursor bit output 166 are each separated by one T. For example, the pre-cursor bit output 162 at T0 ("D1") matches the cursor bit output 164 at T1 and the post-cursor bit output 166 at T2; and the pre-cursor bit output 162 at T1 ("D2") matches the cursor bit output 164 at T2 and the post-cursor bit output 166 at T3.

FIG. 4 shows a chart 400 of illustrative bit streams at a quarter data rate. At quarter rate, each data interval 405 is four clock unit intervals. As in FIG. 3, the chart shows a "PST_OLD" 466 (representing a conventional, separately bit-stuffed generation of a post-cursor bit output) and a "PRE_OLD" 466 (representing a conventional, separately bit-stuffed generation of a pre-cursor bit output) for the quarter-rate case. As shown, in each data interval 405, the PST_OLD 466 is repeated four times, and the PRE_OLD 462 is repeated four times, so that the pre-cursor bit output, the cursor bit output, and the post-cursor bit output, are each effectively separated by 4 T, or one data interval 405. In contrast, using the novel tap generation described herein, the half-rate bit-stuffed pre-cursor bit output 162, cursor bit output 164, and post-cursor bit output 166 in FIG. 4 remain separated only by one T, even though the data interval 405 is 4 T. For example, just as in FIG. 3, the pre-cursor bit output 162 at T0 ("D1") matches the cursor bit output 164 at T1 and the post-cursor bit output 166 at T2; and the pre-cursor bit output 162 at T1 ("D2") matches the cursor bit output 164 at T2 and the post-cursor bit output 166 at T3.

Returning to FIG. 1, embodiments of the transmitter system 125 include a tap weighter 170, and the tap weighter 170 can be coupled with the tap output 154. The tap weighter 170 can be used to adjust weights applied to the pre-cursor bit output 162, cursor bit output 164, and/or post-cursor bit output 166. In some embodiments, the tap weighter 170 operates to apply the tap weights by increasing a pre-cursor tap weight and a post-cursor tap weight as a function of the selected rate (i.e., indicated by the rate select input 138), so that a sub-Nyquist frequency slope profile of an FIR transfer function at the selected rate substantially matches the sub-Nyquist frequency slope profile of an FIR transfer function at the full rate.

Figure 5:
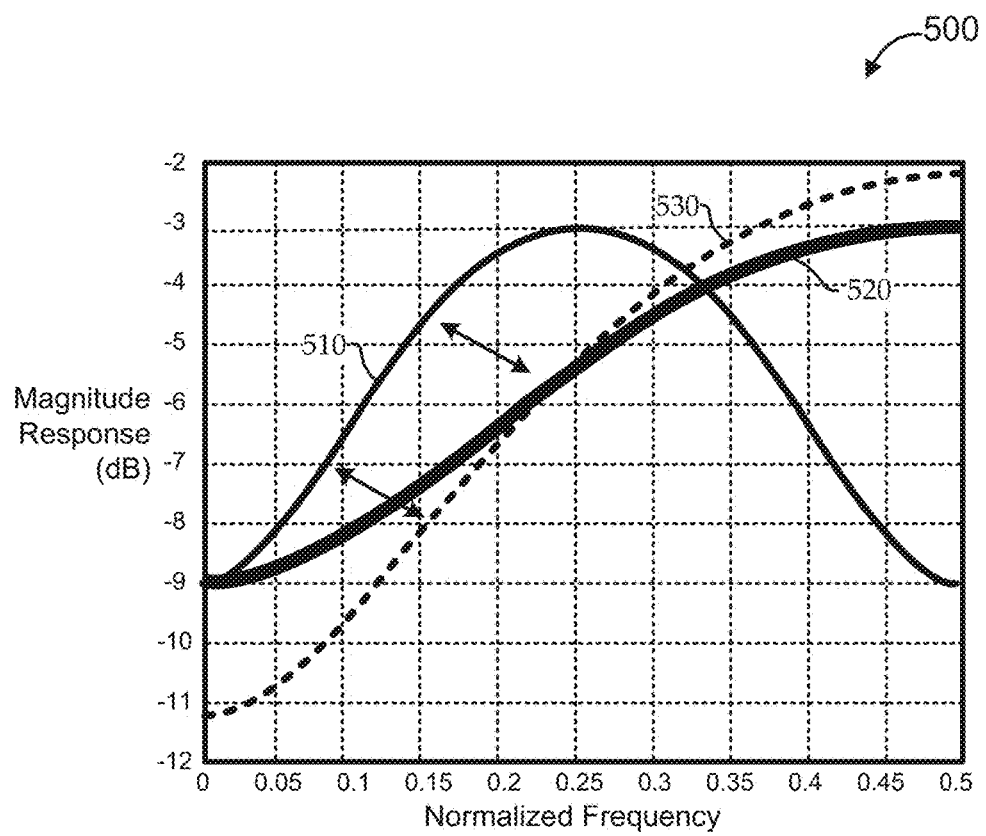
FIG. 5 shows a graph of transfer functions that illustrate magnitude response for an FIR, such as the one in FIG. 1, over a normalized frequency range for the FIR.

For example, FIG. 5 shows a graph 500 of transfer functions that illustrate magnitude response for an FIR 130, such as the one in FIG. 1, over a normalized frequency range for the FIR 130. An illustrative full-rate transfer function 510 shows a relatively smooth bell curve over the frequency range, with the Nyquist frequency for the FIR 130 in the middle of the "bell" (i.e., at around 0.25 in the normalized frequency scale). An illustrative half-rate transfer function 520 shows a similar curve to that of the full rate transfer function 510, but with twice the spread (the middle of the "bell" is at around 0.5 in the normalized frequency scale). The illustrative half-rate transfer function 520 is assumed to use substantially the same tap weights as for the full-rate transfer function 510. With such a half-rate transfer function 520, the slope of the curve in the sub-Nyquist range (between 0.0 and 0.25 in the normalized frequency scale) is appreciably less than that of the full-rate transfer function 510. Such a reduction in slope can impact performance of the transmitter system 125. Increasing the weighting coefficients for the pre-cursor bit output 162 and the post-cursor bit output 166 in the half-rate mode can yield an illustrative adjusted half-rate transfer function 530. As shown, with such an adjusted half-rate transfer function 530, the slope of the curve in the sub-Nyquist range is substantially the same as that of the full-rate transfer function 510.

Figure 6:
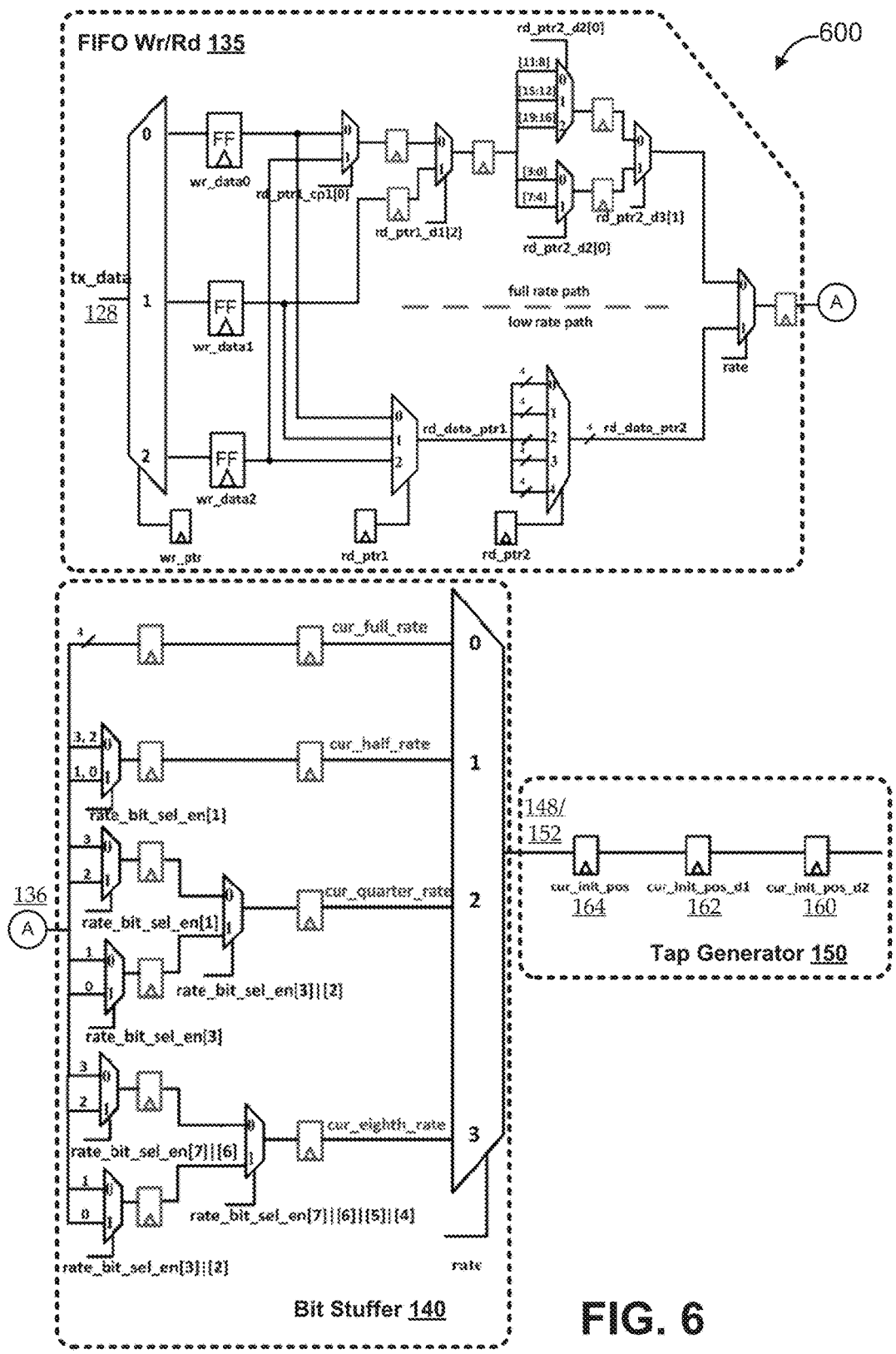
FIG. 6 shows an illustrative circuit schematic for implementing a FIR, such as the one described with reference to FIG. 1.

The novel tap generation described above can be implemented in a number of different ways. FIG. 6 shows an illustrative circuit schematic 600 for implementing a FIR, such as the one described with reference to FIG. 1. The illustrative circuit schematic 600 includes a circuit implementation of a data queue 135, a bit stuffer 140, and a tap generator 150. The data queue 135 receives a digital data input signal 128 and outputs a bit stream input 136. As shown, the data queue 135 can include a full-rate path and a sub-rate path, and/or additional components. Connector "A" indicates that the output of the data queue 135 (i.e., the bit stream input 136) is received by the bit stuffer 140. The bit stuffer 140 can include multiple paths for bit stuffing the bit stream input 136 according to a selected rate. The illustrated bit stuffer 140 includes a full-rate path, a half-rate path, a quarter-rate path, and an eighth-rate path. The output of one of those paths can be selectively output, via a de-multiplexer according to the selected data rate mode, as a bit stream output 148. The bit stream output 148 can be received by the tap generator 150 as a bit-stuffed stream input 152. The tap generator 150 can use the bit-stuffed stream input 152 to generate a pre-cursor bit output 162, a cursor bit output 164, and a post-cursor bit output 166. As illustrated, in each clock unit interval (T), the previous cursor bit output 164 becomes the current pre-cursor bit output 162, and the previous post-cursor bit output 166 becomes the current cursor bit output 164, so that the pre-cursor bit output 162, cursor bit output 164, and post-cursor bit output 166 are always one T apart.

The above systems show only some of the possible implementations of the embodiments described herein, and are not intended to limit embodiments to those implementations. Some embodiments include means for bit-stuffing a stream of input bits to generate a stream of output bits according to a selected data rate; and means for generating a tap output from the stream of output bits at each full-rate clock unit interval (T) to comprise a pre-cursor bit, a cursor bit, and a post-cursor bit, each spaced apart by one T. In some such embodiments, the means for bit-stuffing include means for receiving a stream of input bits, means for receiving a rate select signal that indicates a selected rate of 1/N times a full data rate, and means for sequentially repeating each input bit N times to generate a stream of output bits bit-stuffed according to the selected rate.

Figure 7:
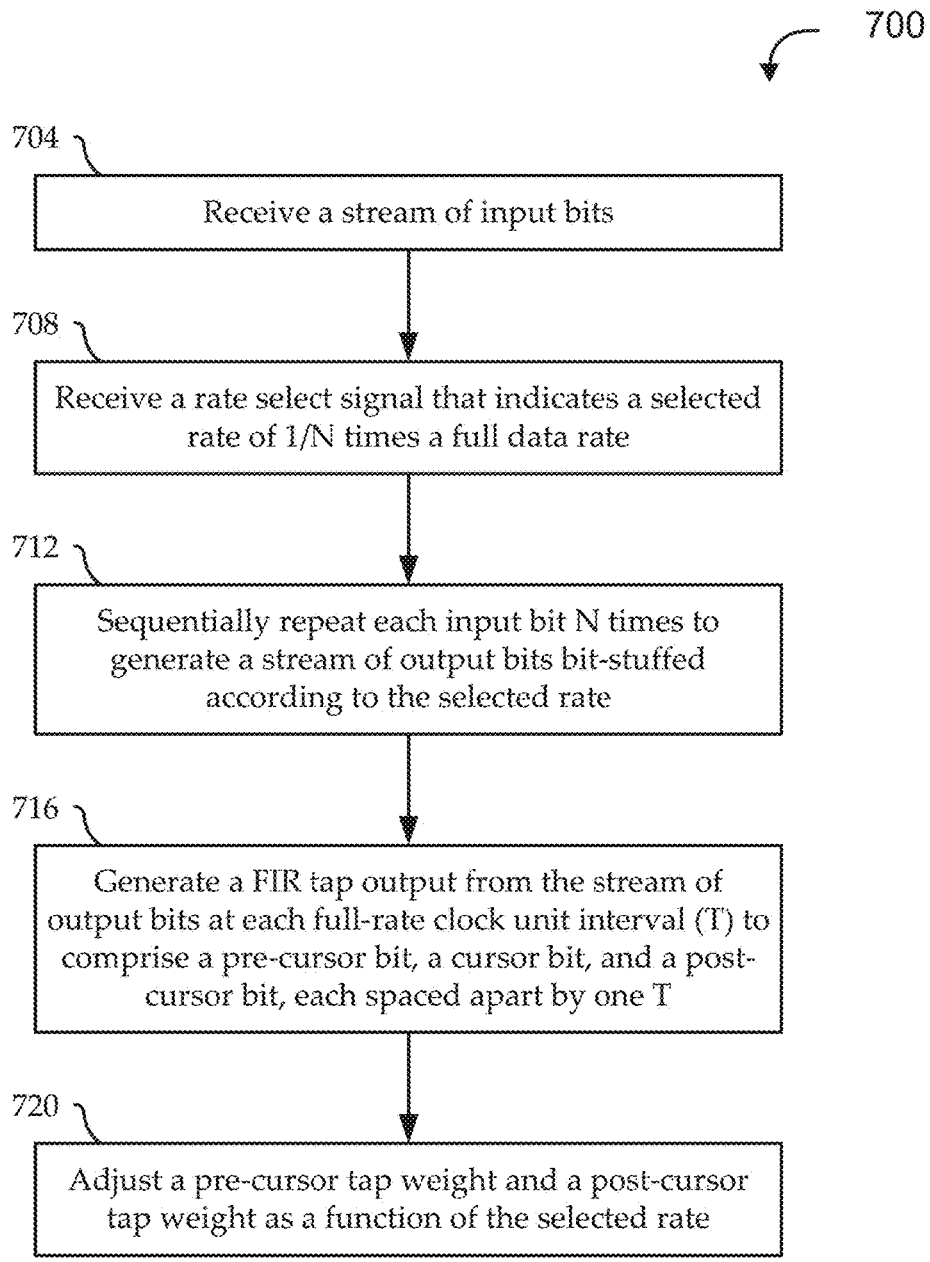
FIG. 7 shows a flow diagram of a method for FIR output generation, according to various embodiments.

Further, embodiments can include methods for tap generation that can be implemented on the systems described above and/or on any other suitable system. FIG. 7 shows a flow diagram of a method 700 for FIR output generation, according to various embodiments. Embodiments begin at stage 704 by receiving a stream of input bits. For example, the stream of input bits can be received from a data queue in a transmitter data path (e.g., in a SERDES of a processor). At stage 708, embodiments can receive a rate select signal that indicates a selected rate of 1/N times a full data rate. For example, the selected rate can be selected from a group consisting of: 1/1 times the full data rate, ½ times the full data rate, ¼ times the full data rate, and ⅛ times the full data rate. At stage 712, each input bit can be sequentially repeated N times to generate a stream of output bits bit-stuffed according to the selected rate.

At stage 716, a FIR tap output can be generated from the stream of output bits at each full-rate clock unit interval (T) to comprise a pre-cursor bit, a cursor bit, and a post-cursor bit, each spaced apart by one T. In some implementations, each output bit B(T) can correspond to the output bit B generated at a respective T; and at each T, the post-cursor bit can correspond to B(T), the cursor bit can correspond to B(T−1), and the pre-cursor bit can correspond to B(T−2). For example, the generating at stage 716 can include generating the pre-cursor bit at each T by latching the cursor bit generated at T−1, and generating the cursor bit at each T by latching the post-cursor bit generated at T−1.

In some embodiments, the method 700 can proceed at stage 720 by adjusting a pre-cursor tap weight and a post-cursor tap weight as a function of the selected rate. For example, the adjusting at stage 720 can include increasing the pre-cursor tap weight and the post-cursor tap weight as a function of the selected rate, so that a sub-Nyquist frequency slope profile of an FIR transfer function at the selected rate substantially matches the sub-Nyquist frequency slope profile of an FIR transfer function at the full rate.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for finite impulse response (FIR) output generation, the method comprising:
   receiving a stream of input bits;
   receiving a rate select signal that indicates a selected rate of 1/N times a full data rate, wherein N is an integer;
   in response to the receiving of the stream of input bits and to the receiving of the rate select signal, sequentially repeating each input bit in the stream of input bits N times to generate a stream of output bits bit-stuffed according to the selected rate; and
   generating a FIR tap output from the stream of output bits at each full-rate clock unit interval (T) to comprise a pre-cursor bit, a cursor bit, and a post-cursor bit, each spaced apart by one T.

2. The method of claim 1, wherein:
   each output bit B(T) corresponds to the output bit B generated at a respective T; and
   at each T, the post-cursor bit corresponds to B(T), the cursor bit corresponds to B(T−1), and the pre-cursor bit corresponds to B(T−2).

3. The method of claim 2, wherein the generating comprises:
   generating the pre-cursor bit at each T by latching the cursor bit generated at T−1 or
   generating the cursor bit at each T by latching the post-cursor bit generated at T−1.

4. The method of claim 1, wherein:
   the stream of input bits is received from a first-in-first-out data queue.

5. The method of claim 1, wherein:
   the selected rate is selected from a group consisting of: 1/1 times the full data rate, ½ times the full data rate, ¼ times the full data rate, and ⅛ times the full data rate.

6. The method of claim 1, further comprising:
   adjusting a pre-cursor tap weight and a post-cursor tap weight as a function of the selected rate.

7. The method of claim 6, wherein:
   the adjusting comprises increasing the pre-cursor tap weight and the post-cursor tap weight as a function of the selected rate, so that a sub-Nyquist frequency slope profile of an FIR transfer function at the selected rate substantially matches the sub-Nyquist frequency slope profile of an FIR transfer function at the full rate.

8. A transmitter system comprising:
   a bit stuffer having:
      a bit stream input;
      a rate select input; and
      a bit stream output comprising a stream of output bits generated by sequentially repeating each input bit of the bit stream input N times to bit-stuff the bit stream output according to the rate select input when the rate select input comprises a rate select signal that indicates a selected rate of 1/N times a full data rate, wherein N is 1, 2, 4, or 8; and
   a tap generator having:
      a bit-stuffed stream input coupled with the bit stream output; and
      a tap output comprising, at each full-rate clock unit interval (T), a pre-cursor bit, a cursor bit, and a post-cursor bit, generated from the bit-stuffed stream input and each spaced apart by one T.

9. The transmitter system of claim 8, wherein:
   each output bit B(T) corresponds to the output bit B generated at a respective T; and
   the tap output at each T comprises the post-cursor bit generated to correspond to B(T), the cursor bit generated to correspond to B(T−1), and the pre-cursor bit generated to correspond to B(T−2).

10. The transmitter system of claim 9, wherein:
    the pre-cursor bit is generated at each T by latching the cursor bit generated at T−1 or
    the cursor bit is generated at each T by latching the post-cursor bit generated at T−1.

11. The transmitter system of claim 8, further comprising:
    a first-in-first-out data queue having a queue output,
    wherein the bit stream input is coupled with the queue output.

12. The transmitter system of claim 8, wherein:
    the selected rate is selected from a group consisting of: 1/1 times the full data rate, ½ times the full data rate, ¼ times the full data rate, and ⅛ times the full data rate.

13. The transmitter system of claim 8, further comprising:
    a tap weighter that operates to apply a tap weight to each of a pre-cursor tap weight and a post-cursor tap weight.

14. The transmitter system of claim 13, wherein:
    the tap weighter operates to apply the tap weights by increasing the pre-cursor tap weight and the post-cursor tap weight as a function of the selected rate, so that a sub-Nyquist frequency slope profile of an FIR transfer function at the selected rate substantially matches the sub-Nyquist frequency slope profile of an FIR transfer function at the full rate.

15. The transmitter system of claim 8, further comprising:
    a finite impulse response (FIR) filter comprising the bit stuffer and the tap generator.

16. The transmitter system of claim 15, further comprising:
    a serializer/deserializer (SERDES) circuit comprising the FIR filter.

17. The transmitter system of claim 16, wherein:
    the SERDES circuit is coupled with a data channel.

18. An integrated circuit comprising a plurality of instances of the transmitter system of claim 8, each coupled with a respective one of a plurality of transmission channel outputs of the integrated circuit.

19. A system for finite impulse response (FIR) output generation, the system comprising:
   means for bit-stuffing a stream of input bits to generate a stream of output bits according to a selected data rate; and
   means for generating a tap output from the stream of output bits at each full-rate clock unit interval (T) to comprise a pre-cursor bit, a cursor bit, and a post-cursor bit, each spaced apart by one T,
   wherein the means for bit-stuffing comprises:
      means for receiving a stream of input bits;
      means for receiving a rate select signal that indicates a selected rate of 1/N times a full data rate, wherein N is 1, 2, 4, or 8; and
      means for sequentially repeating each input bit N times to generate a stream of output bits bit-stuffed according to the selected rate.

* * * * *